(12) United States Patent
Richardson et al.

(10) Patent No.: US 7,260,423 B2
(45) Date of Patent: Aug. 21, 2007

(54) WIRELESS STORAGE DEVICE CONNECTIVITY

(75) Inventors: Thomas E. Richardson, Golden, CO (US); Zahirudeen Premji, Boulder, CO (US); Mohamad H. El-Batal, Westminster, CO (US)

(73) Assignee: LSI Corporation, Milpitas, CA (US)

( * ) Notice: Subject to any disclaimer, the term of this patent is extended or adjusted under 35 U.S.C. 154(b) by 181 days.

(21) Appl. No.: 10/838,726

(22) Filed: May 4, 2004

(65) Prior Publication Data

US 2005/0250555 A1    Nov. 10, 2005

(51) Int. Cl.
*H04B 1/38* (2006.01)
*H04B 7/00* (2006.01)

(52) U.S. Cl. .............. 455/572; 455/41.1; 455/41.2

(58) Field of Classification Search ............. 455/552.1, 455/41.1, 554, 572, 502, 41.2, 66.1, 63.1; 710/58; 709/249; 711/114; 235/492; 340/988; 375/295; 379/93.01, 58
See application file for complete search history.

(56) References Cited

U.S. PATENT DOCUMENTS

| | | | | |
|---|---|---|---|---|
| 5,841,122 | A * | 11/1998 | Kirchhoff | 235/492 |
| 6,424,820 | B1 * | 7/2002 | Burdick et al. | 455/41.1 |
| 6,696,982 | B2 * | 2/2004 | Yoshioka et al. | 340/988 |
| 6,895,467 | B2 * | 5/2005 | Lubbers et al. | 711/114 |
| 6,954,616 | B2 * | 10/2005 | Liang et al. | 455/63.1 |
| 2003/0157974 | A1 | 8/2003 | Lin | |
| 2003/0161411 | A1 * | 8/2003 | McCorkle et al. | 375/295 |
| 2003/0181229 | A1 * | 9/2003 | Forster et al. | 455/575.7 |
| 2003/0228005 | A1 * | 12/2003 | Melick et al. | 379/93.01 |
| 2004/0023683 | A1 * | 2/2004 | Mizuhiki et al. | 455/550.1 |
| 2004/0068591 | A1 * | 4/2004 | Workman et al. | 710/58 |
| 2004/0127254 | A1 * | 7/2004 | Chang | 455/557 |
| 2004/0203362 | A1 * | 10/2004 | Pattabiraman et al. | 455/41.2 |
| 2004/0224638 | A1 * | 11/2004 | Fadell et al. | 455/66.1 |
| 2004/0242250 | A1 * | 12/2004 | Sasai et al. | 455/502 |
| 2004/0259499 | A1 * | 12/2004 | Oba et al. | 455/41.2 |
| 2005/0021869 | A1 * | 1/2005 | Aultman et al. | 709/249 |
| 2005/0080895 | A1 * | 4/2005 | Cook et al. | 709/224 |

* cited by examiner

*Primary Examiner*—Joseph Feild
*Assistant Examiner*—Kiet Doan
(74) *Attorney, Agent, or Firm*—Duft, Bornsen, & Fishman

(57) ABSTRACT

A circuit providing a wireless connection for receipt and/or transmission of electronic signals between a storage device and an external device such as a host system, a storage subsystem controller, or a storage subsystem. The wireless connection circuit may include a wireless data connection to provide wireless exchange of data signals between the storage device and the external device. The wireless connection circuit may also provide an inductive coupling for power supplied to the storage device. In one aspect hereof the wireless connectivity (data, power or both) may be provided as enhanced circuits on a controller circuit integrated with the storage device. In another aspect hereof, the wireless connectivity may be provided as an adapter or interface circuit coupled to an existing storage device interface to adapt wired connections of the storage device to an external device through a wireless signal exchange protocol.

11 Claims, 5 Drawing Sheets

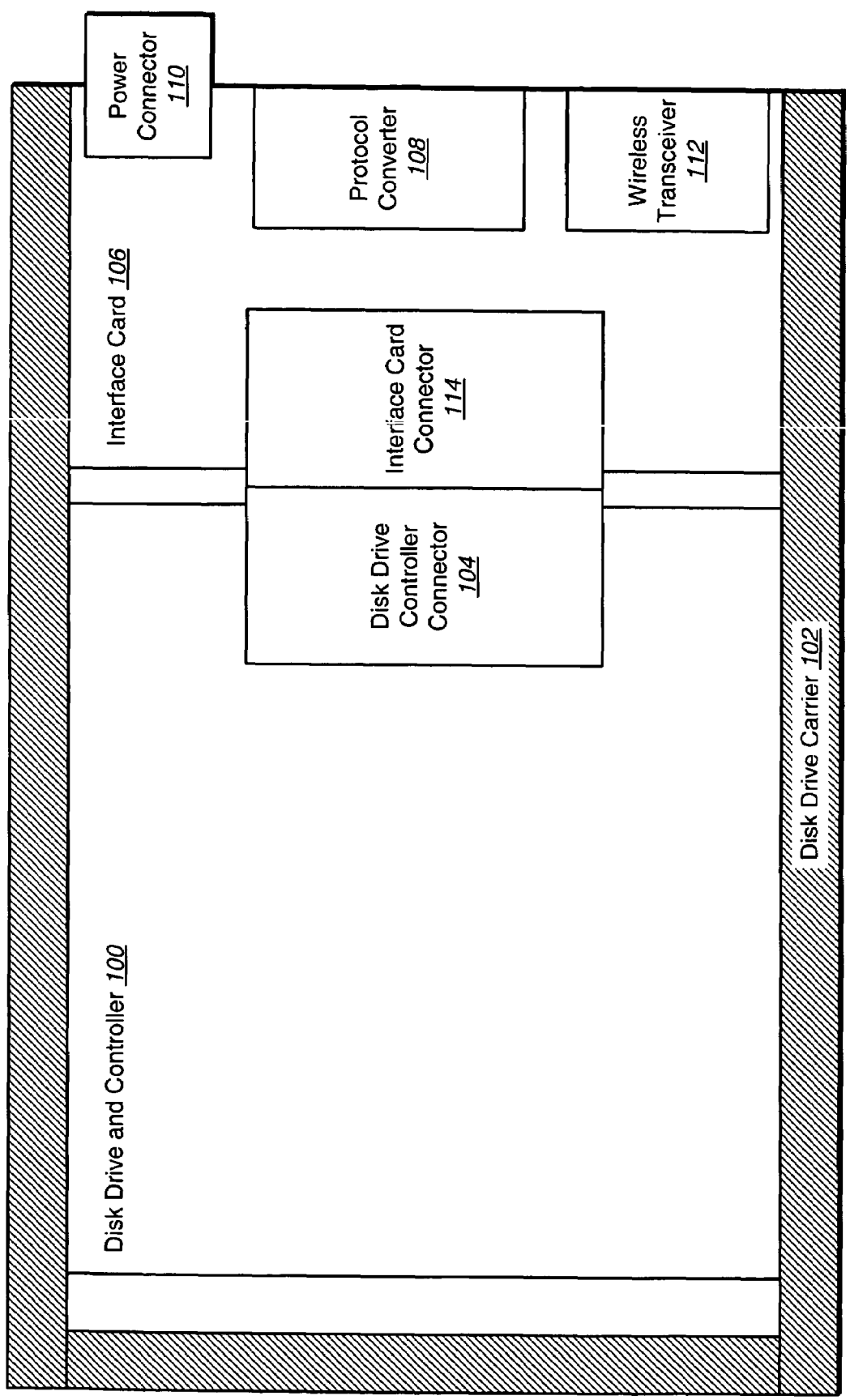
FIG._1

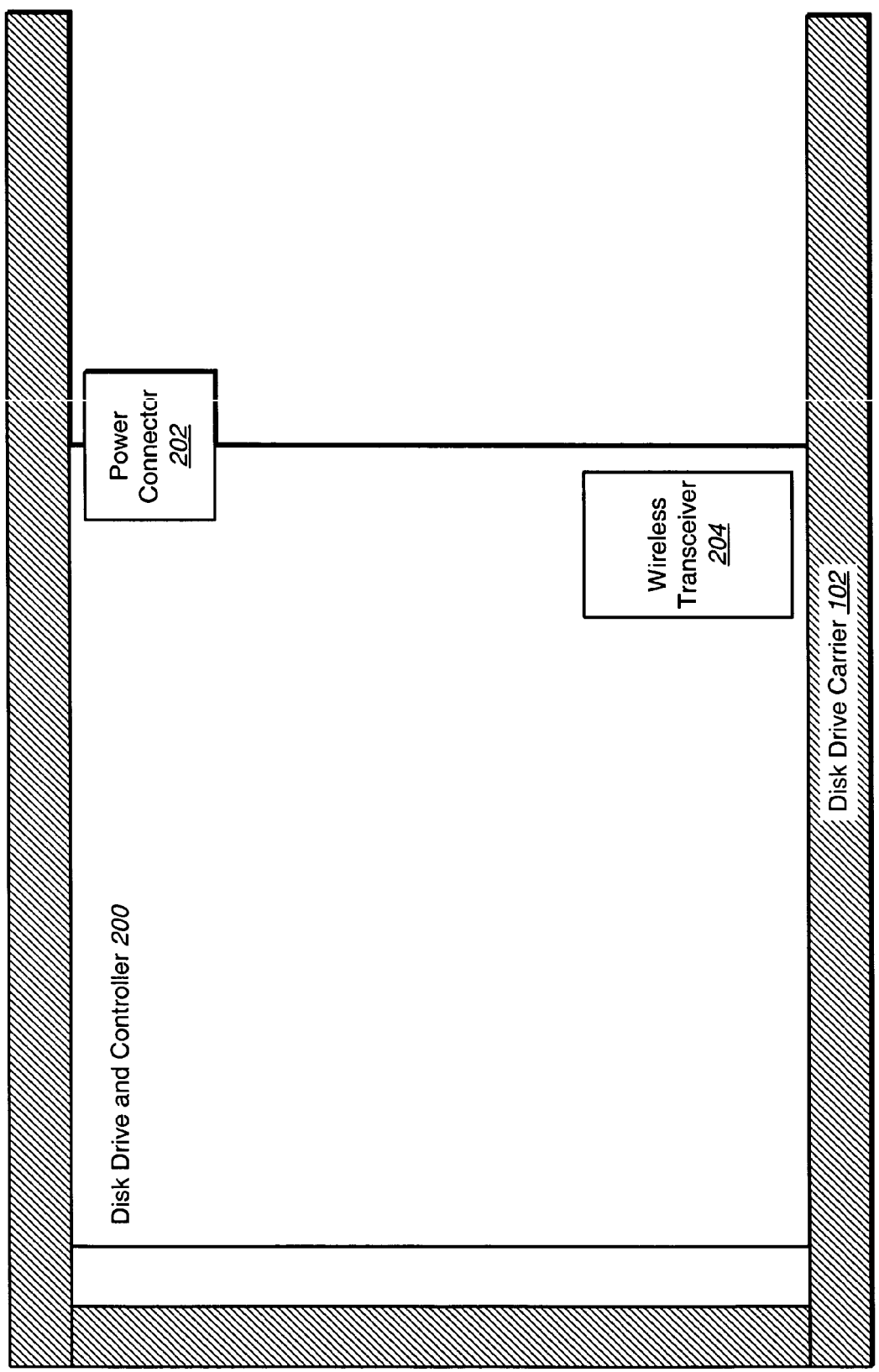

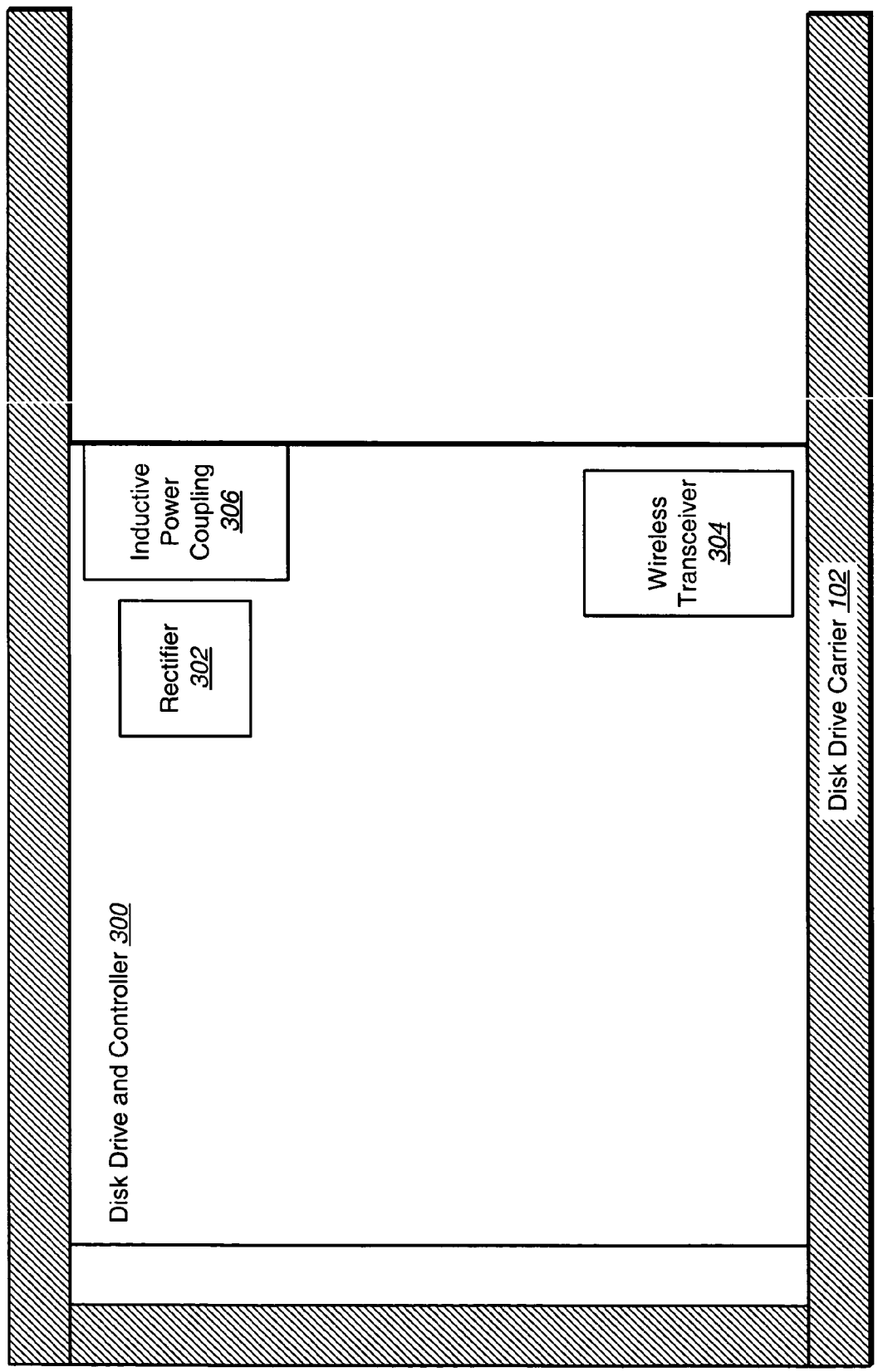
FIG._3

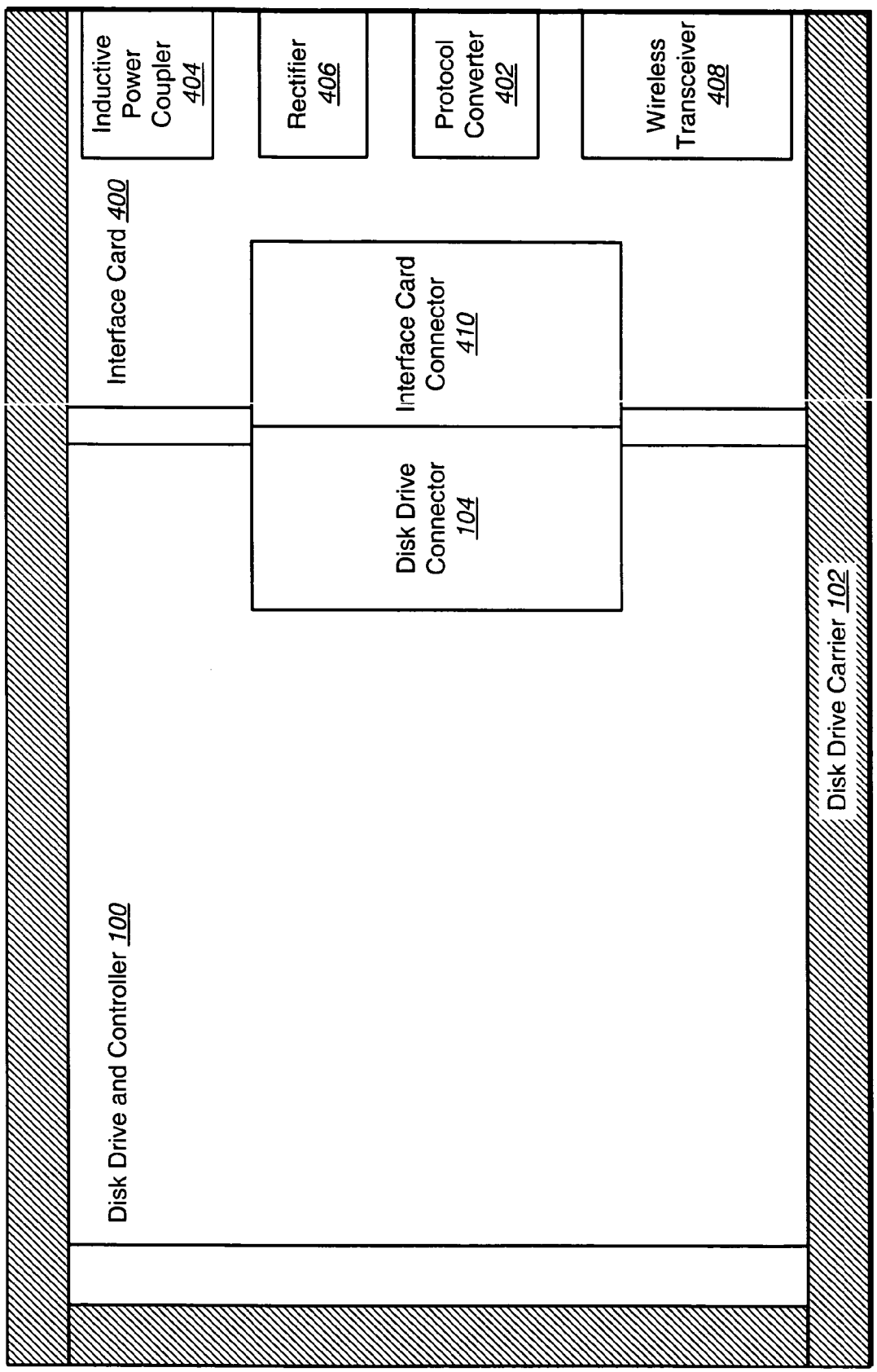
FIG._4

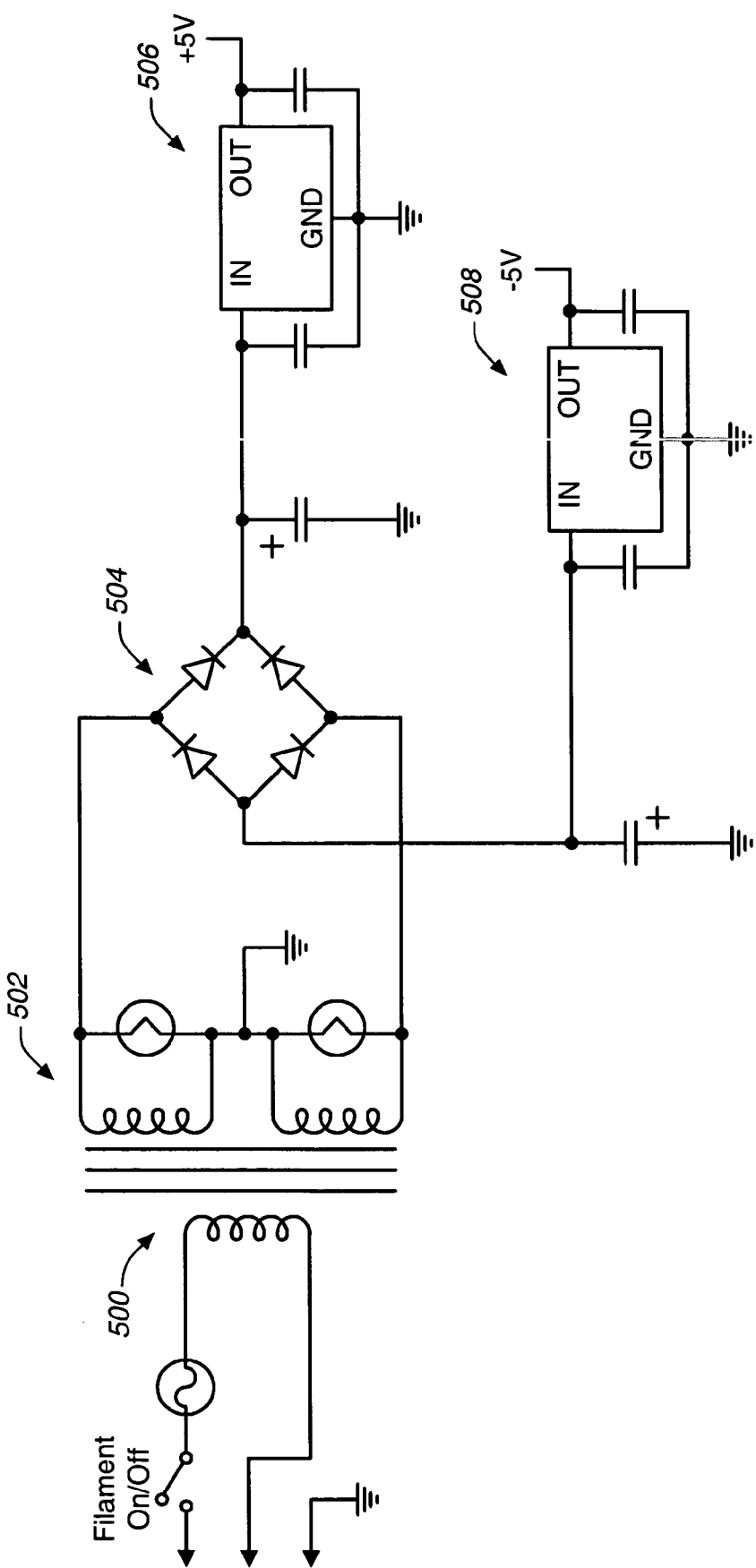
FIG._5

WIRELESS STORAGE DEVICE CONNECTIVITY

BACKGROUND OF THE INVENTION

1. Field of the Invention

The invention relates generally to storage device connections and more specifically relates to structures to provide a wireless connection between a disk drive or other storage device and an external device such as a controlling host, storage subsystem, or storage subsystem controller.

2. Related Patents

This patent is related to commonly owned patent application serial number 10/838,725 filed on 4 May 2004 (herewith) and entitled WIRELESS STORAGE ENTERPRISE CONNECTIVITY which is hereby incorporated by reference.

3. Discussion of Related Art

It is generally known in the computing storage arts that a storage device utilizes electronic signals to exchange information between the storage device and an external device controlling the storage device. Examples of such a storage device may include a magnetic or optical disk drives, magnetic or optical tape drives, and other semiconductor-based, volatile, and nonvolatile memory components (such as flash memory devices or so-called "RAM-disks"). Examples of an external device for controlling a storage device may include a host computing system, a host adapter within such a host system, a storage subsystem, a storage controller within such a storage subsystem, or any other controlling device coupled to the storage device.

Typically, the signals exchanged include power signals to provide electrical power for operating the storage device and information signals (command, status and data signals) used for controlling operation of the storage device and for exchanging data to be stored in and read from the storage device. Typically, an electrical power wiring harness provides a hard-wired connection to apply power signals from an external source or device to the storage device for purposes of supplying power to the storage device. Most frequently, the electrical power signals so applied are direct current ("DC") electrical power signals including one or more DC voltage levels used for operating the storage device. In addition, a second signal cable is typically used for exchanging information signals between an external device and the storage device. This second interface cable may utilize any of several well-known interface signal media and protocol standards including, for example, IDE, SCSI, Fibre Channel, serial attached SCSI ("SAS") and serial AT attachment ("SATA") signaling standards. Those of ordinary skill in the art will recognize a wide variety of other well known signaling media and protocols used for exchanging information signals and power signals between storage devices and external device used to control the storage device. In particular, some signaling cables and signal paths provide both power and information signals over a common cabling/signal harness. It is not necessary that power and information signals be segregated between two (or more) distinct cable structures.

In a simple, single computing node, hard-wire power and information cable harnesses between the external device (i.e., internal to the computing system) and the storage device provide a relatively simple, inexpensive design that is easily manipulated by a human user or technician. A first cable harness may be used for providing power to one or more storage devices within such a simple, computing node and a separate cable harness may typically be used for coupling information signals within such a host system. However, in larger, more complex storage subsystems that may include tens, hundreds or even thousands of storage devices within one or more storage enclosures, such hard-wired cable interface techniques are both complex and costly. Complex wiring harnesses and backplanes for exchange of signals are typically utilized and impose a significant cost in the overall storage subsystem. Distribution of such power and information signals within complex storage subsystems therefore presents problems in complexity and cost. Although serial attach standards including optical serial attachments somewhat simplify these issues. However, even simplified serial attach cabling remain costly and complex where tens, hundreds or even thousands of storage devices are provided within a large, complex storage subsystem.

It is evident from the above discussion that an ongoing problem persists in simplifying and reducing cost associated with distributing power and information signals between external controlling devices and storage devices in large complex computing and storage enterprises.

SUMMARY OF THE INVENTION

The present invention solves the above and other problems, thereby advancing the state of the useful arts, by providing structures for wireless distribution of power and/or information signals between external controlling devices and associated storage devices. A wireless transceiver may be provided in accordance with features and aspects hereof to permit wireless exchange of information signals (command, status and data signals) between external devices and associated storage devices. Further, a wireless structure, such as an inductive coupling, may be provided in accordance with features and aspects hereof to permit wireless power distribution from external devices to storage devices. The wireless connectivity features and aspects hereof therefore reduce complexity and costs associated with distribution of signals between external devices and associated storage devices. Features and aspects hereof therefore reduce or eliminate the need for costly, complex wiring harnesses and distribution devices (such as signal backplanes) coupled between external devices and storage devices. Other features and aspects hereof provide that such wireless interfacing may be provided by enhanced features integrated with controller electronics of the storage device. Still other features and aspects hereof provide that the wireless interfacing structures may be implemented as a separate wireless interface circuit adapted for coupling between existing storage devices (i.e., "legacy" storage devices) and external devices. In such a wireless interface implementation, protocol conversion features may be provided to convert between wireless information signaling standards and protocols and associated signaling standards and protocols provided by the legacy storage system (i.e., IDE, SCSI, Fibre Channel, SAS, SATA, etc.).

A first feature hereof therefore provides a storage device comprising: a storage mechanism; and a wireless interface adapted to receive electronic signals from an external device through a wireless medium.

Another aspect hereof further provides that the wireless interface further comprises: a wireless power connection to supply power to the storage device.

Another aspect hereof further provides that the wireless power connection further comprises: an inductive power coupling to an external power source.

Another aspect hereof further provides that the wireless interface further comprises: a wireless data connection to an external host device.

Another aspect hereof further provides that the wireless data connection further comprises: a high bandwidth wireless data connection.

Another aspect hereof further provides that the high bandwidth wireless data connection further comprises: an Ultra-Wide Band wireless data connection.

Another feature hereof provide for a system comprising: a storage device having a wired connection port; and a wireless interface coupled to the wired connection port of the storage device to adapt wireless electronic signals for exchange between and external device and the storage device through the wired connection port.

Another aspect hereof further provides that the wired connection port comprises a data connection, and that the wireless interface is adapted to exchange signals between the data connection and the external device.

Another aspect hereof further provides that the wireless interface further comprises: a wireless transceiver for exchanging data signals with the external device through a wireless transmission medium and protocol; and a protocol conversion element coupled to the wireless transceiver for converting the wireless protocol exchanges into corresponding exchanges with the storage device through the data connection.

Another aspect hereof further provides that the wireless transceiver and the protocol conversion element are operable in accordance with Ultra-Wide Band wireless transmission protocols.

Another aspect hereof further provides that the wired connection port comprises a power connection for receiving power for operation of the storage device, and further provides that the wireless interface is adapted to provide power to the power connection of the storage device received from a wireless connection to the external device.

Another aspect hereof further provides that the wireless interface further comprises: an inductive coupling to power generated by the external device.

Another aspect hereof further provides that the power generated by the external device is alternating current electrical power and further provides that the wireless interface further comprises: a rectifier to generate direct current electrical power from the alternating current electrical power received from the external device.

Another aspect hereof further provides that the wireless interface comprising: a wireless transceiver for exchanging data signals with the external device; and a disk drive interface connector coupled to the wireless transceiver and coupled to the disk drive for exchanging the data signals with the disk drive.

Another aspect hereof further provides for a protocol converter for converting data signals exchanged between the external device and the disk drive through the wireless transceiver.

Another aspect hereof further provides that the wireless transceiver and the protocol converter are operable in accordance with Ultra-Wide Band standards.

Another aspect hereof further provides an inductive coupling to derive a power signal from the external device and to apply the derived power signal to the disk drive.

Another aspect hereof further provides that the external device provides and alternating current electric field and wherein the inductive coupling includes a rectifier to convert the alternating electric current to direct current for application to the disk drive.

BRIEF DESCRIPTION OF THE DRAWINGS

FIG. 1 is a block diagram of an exemplary embodiment of a legacy disk drive coupled to a wireless interface to provide for wireless data connectivity in accordance with features and aspects hereof.

FIG. 2 is a block diagram of an exemplary embodiment of a disk drive enhanced to provide wireless data connectivity in accordance with features and aspects hereof.

FIG. 3 is a block diagram of an exemplary embodiment of a disk drive enhanced to provide both wireless data and wireless power connectivity in accordance with features and aspects hereof.

FIG. 4 is a block diagram of an exemplary embodiment of a legacy disk drive coupled to a wireless interface to provide for both wireless data and wireless power connectivity in accordance with features and aspects hereof.

FIG. 5 is a circuit diagram of an exemplary wireless (inductive) power coupling as may be used in accordance with features and aspects hereof.

DETAILED DESCRIPTION OF THE DRAWINGS

FIG. 1 is a block diagram of an exemplary embodiment of features and aspects hereof to provide a wireless interface 106 adapted for coupling to an existing, legacy disk drive and integrated controller 100 (i.e., a storage device). Wireless interface 106 exchanges information with an external device (not shown) through wireless transceiver 112. Those of ordinary skill in the art will recognize that the external device (not shown) may be any controlling device coupled to the storage device. Exemplary external devices may include a host system, a host bus adapter such as within a host system, a storage subsystem, a storage controller within such a storage subsystem (such as a RAID storage controller), etc.

Any of several well-known wireless transmission protocols and circuits may be applied for purposes of transmitting and receiving information signals between the wireless interface 106 and an external device. For example, in one embodiment hereof, standards for the Ultra-Wide Band ("UWB") wireless protocols proposed by various segments of the networking/telecommunications industry may be utilized for high speed exchange of information between the wireless interface 106 and an external device (not shown) via wireless transceiver 112. In particular, the UWB standards are, at the time of this filing, still evolving in industry standards organizations under the auspices of the IEEE 802.15.3a task group. Various proposals remain under consideration. Two lead proposals for "UWB" standards vary, in essence, as regards their proposed modulation techniques. However, all presently known proposals provide the desired high speed exchanges to be useful in accordance with features and aspects hereof. Those of ordinary skill in the art will recognize that any appropriate wireless transmission protocol standard may be utilized that provides sufficiently high bandwidth to permit practical utilization of the storage device 100.

Interface card 106 may also include a protocol converter circuit 108 adapted to convert information exchanged between the wireless interface 106 and an external device (not shown) into appropriate exchanges for disk drive and controller 100. In other words, Ultra-Wide Band or other wireless protocol exchanges may be converted as required by protocol converter 108 for application to disk drive and controller 100. As noted above, disk drive and controller 100 may typically be adapted for exchanging information using well known storage media and protocols such as IDE, SCSI, etc.

Wireless interface 106 may include interface connector 114 adapted for mating with a corresponding disk drive connector 104 associated with the controller electronics of disk drive and controller 100. Information signals exchanged via wireless transceiver 112 and converted by a protocol converter circuit 108 may be exchanged with disk drive and controller 100 through the mated connectors 104 and 114.

In many storage subsystem applications, disk drive and controller 100 may be housed within a standardized mechanical disk drive carrier 102 as shown in FIG. 1. Such a carrier 102 simplifies mechanical aspects of insertion and removal of disk drive and controller 100 within a corresponding storage enclosure or rack of a storage subsystem. Those of ordinary skill in the art will recognize that disk drive carrier 102 is not required for features and aspects hereof but rather is shown as typical of exemplary environments in which large storage subsystems integrate tens, hundreds or even thousands of storage devices. Carrier 102 may also simplify mechanical aspects of mating interface card 106 with disk drive and controller 100 by helping to properly align the components.

Wireless interface card 106 may also include a power connector 110 for coupling wireless interface card 106 to hard-wired power signals provided by an external device (not shown) to provide appropriate power signals for operation of disk drive and controller 100 and for operation of wireless interface card 106. Where such hard-wired power signals are applied to wireless interface 106 via power connector 110, the power signals may be appropriately distributed from interface card 106 to disk drive and controller 100 through mated connectors 104 and 114 or through other power connectors (not shown) mating wireless interface 106 to disk drive and controller 100.

The exemplary embodiment shown in FIG. 1 may be useful, for example, where wireless exchange of information signals is desired for application with older, legacy storage devices. A storage subsystem may therefore be adapted or converted to utilize wireless information signal exchange without requiring upgrade and replacement of all storage devices within the storage subsystem.

Those of ordinary skill and the art will recognize a variety of equivalent structures as a matter of design choice to provide wireless information signal exchange in accordance with features and aspects hereof. FIG. 1 is therefore intended merely to provide one exemplary embodiment of a wireless interface card adapted for providing wireless information signal exchange in a storage subsystem utilizing older, legacy storage devices. Further, though FIG. 1 depicts a disk drive and controller 100, those of ordinary skill in the art will recognize that any storage device may utilize the wireless features and aspects hereof. For example, a tape drive, optical disk drive (i.e., CD or DVD), semiconductor memory devices (e.g., flash memory or other non-volatile memory devices), RAM-disks, etc. may utilize the wireless interfacing features and aspects hereof to reduce interconnect complexities and costs.

FIG. 2 is a block diagram depicting another exemplary embodiment hereof in which wireless transceiver 204 is integrated with existing control electronics associated with disk drive and controller 200. As above with respect to FIG. 1, power connector 202 of FIG. 2 permits hard-wired coupling of power signals provided by an external device (not shown). The enhanced features of disk drive and controller 200 include a wireless transceiver 204 to permit direct exchange of wireless information signals between the enhanced storage device and an external device (not shown). Also, as above with respect to FIG. 1, the enhanced storage device of FIG. 2 provides for wireless exchange of information signals between the enhanced storage device 200 and appropriate external devices (not shown). The enhanced storage device 200 of FIG. 2 may further reduce cost and complexity as compared to the exemplary embodiment of FIG. 1 by eliminating the need for an intermediate wireless interface card or adapter coupled between a storage device and an external device. By contrast, the enhanced storage device 200 of FIG. 2 integrates the wireless information signal exchange within the control electronics of the enhanced storage device 200.

FIG. 3 is a block diagram of an enhanced disk drive and controller 300 providing wireless electronic signal connectivity in accordance with features and aspects hereof. Disk drive and controller 300 is enhanced with the addition of wireless transceiver 304 to permit wireless exchange of information signals (command, status and data signals) with an associated external device (not shown). In addition, disk drive and controller 300 is further enhanced in accordance with features and aspects hereof to provide for wireless power signal coupling. Inductive power coupling circuit 306 provides an inductive coupling power signals provided by an external device (not shown). Typically, such an inductive power coupling 306 receives alternating electrical current from the external device or source. Rectifier 302 therefore converts the received alternating current (received through inductive power coupling 306) into appropriate levels of direct current. Such rectified direct current may then be applied to operate disk drive and controller 100 including, for example, wireless transceiver 304 and other control and logic circuits associated therewith.

Those of ordinary skill in the art will readily recognize common inductive power coupling and associated rectifier designs that may be applied as coupling 306 and rectifier 302 of FIG. 3. For example, such designs are common in transformer designs where an AC current source applied to a coil induces a corresponding AC current in nearby coils (positioned nearby but not in a hard-wired arrangement and hence a wireless coupling). FIG. 5 is a diagram of such a typical transformer design representative of an exemplary wireless (inductive) coupling between a power source and a storage device. A primary coil 500 carrying, for example, a common 115 volt AC current. The primary coil 500 induces a proportional current in secondary coils 502. The induced current is then applied to a standard rectifier circuit 504 to generate a corresponding DC voltage/current source. The generated, rectified DC source may then be applied to one or more voltage regulator devices 506 through 508 to produce a particular, regulated DC voltage required by the storage device 100. Appropriate selection of such coils, rectifiers and voltage regulators to provide the desired DC voltages and current levels in a particular application are well known matters of design choice for those of ordinary skill in the art.

FIG. 4 is a block diagram depicting yet another exemplary embodiment of wireless connectivity features and aspects hereof. FIG. 4 combines aspects of FIG. 1 and FIG. 3 such that an interface card 400 couples to disk drive and controller 100 through mated connectors 104 and 410. Disk drive and controller 100 may therefore represent an existing, older (legacy) storage device such that interface card 400 provides enhanced wireless connectivity for the existing storage device. Interface card 400 therefore includes wireless transceiver 408 for exchanging information signals (command, status and data signals) with an external device (not shown). The information signals so exchanged are converted as required by protocol converter circuit 402 for exchange with disk drive and controller 100 through mated connectors 104 and 410.

Interface card 400 may also include inductive power coupler 404 and rectifier 406 to provide wireless connectivity for electrical power signals provided by an external source (not shown). As discussed above, inductive power coupler 404 may typically receive alternating electrical current signals by the inductive (wireless) coupling and rectifies the alternating electrical current to generate requisite direct current electrical signals. The rectified direct current electrical power signals may then be applied as required to operate circuits within interface card 400 as well as disk drives and controller 100 through mated connectors 104 and 410.

Those of ordinary skill in the art will recognize a wide variety of equivalent structures providing one or both of wireless information signal connectivity and electrical power signal connectivity. Further, other variations wherein such wireless connectivity is integrated with control circuits of the storage device may be readily apparent to those of ordinary skill the art as a matter of design choice. Still further, other configurations providing for an external interface card or adapter to permit older (legacy) storage devices to be adapted for wireless signaling configurations will be readily apparent to those of ordinary skill in the art.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A storage device comprising:
   a storage mechanism;
   a wireless interface adapted to receive electronic data signals from an external device through a wireless medium; and
   an inductive coupling to derive a power signal from the external device and to apply the derived power signal to the disk drive,
   wherein the external device provides and alternating current electric field and wherein the inductive coupling includes a rectifier to convert the alternating electric current to direct current for application to the disk drive, and
   wherein the inductive coupling is capable of providing sufficient wireless power to power the disk drive.

2. The storage device of claim 1 wherein the wireless interface further comprises:
   a wireless data connection to an external host device.

3. The storage device of claim 2 wherein the wireless data connection further comprises:
   a high bandwidth wireless data connection.

4. The storage device of claim 3 wherein the high bandwidth wireless data connection further comprises:
   an Ultra-Wide Band wireless data connection.

5. A system comprising:
   a storage device having a wired connection port; and a wireless interface coupled to the wired connection port of the storage device to adapt wireless electronic signals for exchange between and external device and the storage device through the wired connection port,
   wherein the wired connection port comprises a power connection for receiving power for operation of the storage device,
   wherein the wireless interface is adapted to provide power to the power connection of the storage device received from a wireless connection to the external device,
   wherein the wireless interface further comprises an inductive coupling to power generated by the external device, and
   wherein the power generated by the external device is alternating current electrical power and wherein the wireless interface further comprises:
   a rectifier to generate direct current electrical power from the alternating current electrical power received from the external device, and
   wherein the generated direct current electrical power provides sufficient wireless power to power the storage device.

6. The system of claim 5
   wherein the wired connection port further comprises a data connection, and
   wherein the wireless interface is adapted to exchange signals between the data connection and the external device.

7. The system of claim 6 wherein the wireless interface further comprises:
   a wireless transceiver for exchanging data signals with the external device through a wireless transmission medium and protocol; and
   a protocol conversion element coupled to the wireless transceiver for converting the wireless protocol exchanges into corresponding exchanges with the storage device through the data connection.

8. The system of claim 7 wherein the wireless transceiver and the protocol conversion element are operable in accordance with Ultra-Wide Band wireless transmission protocols.

9. A wireless interface for coupling a disk drive to a host device, the wireless interface comprising:
   a wireless transceiver for exchanging data signals with an external device; a disk drive interface connector coupled to the wireless transceiver and coupled to the disk drive for exchanging the data signals with the disk drive; and
   an inductive coupling to derive a power signal from the external device and to apply the derived power signal to the disk drive,
   wherein the external device provides and alternating current electric field and wherein the inductive coupling includes a rectifier to convert the alternating electric current to direct current for application to the disk drive, and
   wherein the inductive coupling is capable of providing sufficient wireless power to power the disk drive.

10. The wireless interface of claim 9 further comprising:
    a protocol converter for converting data signals exchanged between the external device and the disk drive through the wireless transceiver.

11. The wireless interface of claim 10 wherein the wireless transceiver and the protocol converter are operable in accordance with Ultra-Wide Band standards.

* * * * *